United States Patent [19]

Wright

[11] Patent Number: 4,869,409
[45] Date of Patent: Sep. 26, 1989

[54] VAN SPARE WHEEL AND TIRE CARRIER

[76] Inventor: Ronald Wright, 5773 S. Masterson Ave., Tucson, Ariz. 85706

[21] Appl. No.: 278,186

[22] Filed: Dec. 1, 1988

[51] Int. Cl.$^4$ .............................................. B62D 43/02
[52] U.S. Cl. ............................... 224/42.21; 224/42.24; 224/42.26; 414/466
[58] Field of Search ................... 224/42.03 R, 42.06, 224/42.08, 42.12, 42.21, 42.24, 309, 315, 324, 330, 42.13, 42.15, 42.19, 42.26, 42.28, 42.42, 42.45 R; 414/463, 466

[56] References Cited

U.S. PATENT DOCUMENTS

| 2,698,118 | 12/1954 | Dickason | 224/42.21 |
|---|---|---|---|
| 3,371,832 | 3/1968 | Sekino et al. | 224/42.21 |
| 3,753,520 | 8/1973 | Bodde | 224/42.06 |
| 3,866,777 | 2/1975 | Staranick et al. | 214/454 |
| 4,019,664 | 4/1977 | Weiler | 224/42.24 |
| 4,042,157 | 8/1977 | Weiler | 224/42.21 |
| 4,282,994 | 8/1981 | Hilliard | 224/42.06 |
| 4,434,919 | 3/1984 | Flowers | 224/42.21 |
| 4,679,717 | 7/1987 | Hansen | 224/42.06 |
| 4,718,582 | 1/1988 | Iovenitti | 224/42.21 |
| 4,817,834 | 4/1989 | Weiler | 224/42.06 |

FOREIGN PATENT DOCUMENTS 264160  12/1963  Australia .......................... 224/42.21

Primary Examiner—Henry J. Recla
Assistant Examiner—Robert M. Fetsuga
Attorney, Agent, or Firm—Richard C. Litman

[57] ABSTRACT

A wheel and tire carrier for a vehicle such as a van includes a base assembly transversely affixed to a hinged door and which pivotally supports a swing arm to which a wheel is mounted. A latch mechanism normally secures the mounted wheel juxtaposed the door and when actuated, allows the arm and wheel to be arcuately displaced about a pivot point adjacent the free edge of the door thereby allowing the door to be opened about its hinges, no less than 90 degrees as the arm maintains the wheel free and clear of the body of the vehicle.

6 Claims, 2 Drawing Sheets

VAN SPARE WHEEL AND TIRE CARRIER

FIELD OF THE INVENTION

This invention relates generally to an improved device for the carriage of a spare wheel and tire or other large object on a vehicle equipped with vertically hinged rear doors or tailgate, and mre specifically to an apparatus which allows such a spare wheel or tire to be easily moved clear of the doors or tailgate so as to allow the complete and full opening of such doors.

BACKGROUND OF THE INVENTION

Light utility van and large station wagon type vehicles have become increasingly popular in recent years, due to their relatively efficient use of space. Many commercial concerns have found such vehicles useful, as have increasing numbers of people for various purposes, such as camping, car pool purposes, the carriage of garden tools or other equipment, etc.

A problem with such vehicles is the carriage of a spare wheel and tire. In many instances it is impractical to carry such a large, bulky object inside the vehicle due to its inaccessibility when other large objects are carried, or the necessity of keeping the interior clean when equipped as a camper or passenger vehicle. For these reasons, as well as others, the mounting of the spare wheel and tire on the exterior of the vehicle has become popular.

Due to limitations of width and height, as well as engine cooling and ccess, the most practical area to mount such a spare wheel and tire is on one of the rear doors of the vehicle. However, due to the bulk of the tire it is generally not possible to completely open that door. In fact, typically the door on which the spare wheel and tire are mounted is incapable of opening more than some 30 degrees, beyond which the projecting diameter and width of the tire beyond the hinge line of the door interferes with the body of the vehicle. Such a small arc of travel effectively limits the total width of the opening to little more than the width of a single door, even though both doors may be open, making it impossible to horizontally insert or remove wide, bulky objects such as standard width sheets of plywood, drywall, mattresses, etc. without first removing the spare wheel and tire from its mount. The present invention offers a convenient, simple method of temporarily moving the spare wheel and tire to allow the door upon which it is mounted to be opened fully, without the necessity of initially removing the wheel and tire from its mounting structure.

DESCRIPTION OF THE RELATED ART

External vehicle spare tire carriers are well known in the art. An early example is Sekino et al U.S. Pat. No. 3,371,832 disclosing a hinged carrier attached to the rear door of a van or wagon type vehicle. This patent, however, claims unlatching actuation means within the interior of the vehicle, either mechanically or electrically actuated. This results in a relatively complex device.

Weiler U.S. Pat. No. 4,042,157 discloses an apparatus intended for use as a spare tire carrier for a van type vehicle, mountable upon a rear door of the vehicle. No provision is made, however, for quickly releasing the apparatus in order to allow the spare tire to be moved outward from the vehicle door and body in order to eliminate interference between spare tire and vehicle body when the vehicle door is opened.

Iovenitti U.S. Pat. No. 4,718,582 provides a means for displacing a spare tire on an external vehicle mount. The displacement, however, is linear rather than angular and is accomplished by a roller mechanism operating within slotted tracks. The travel of the spare tire may be somewhat limited with such a method, and such a mechanism is relatively vulnerable to problems with rust, dirt, etc. within the slotted tracks and roller bearings.

SUMMARY OF THE INVENTION

Accordingly, it is an object of the present invention to provide an improved apparatus for the carriage of a spare wheel or tire or other bulky object on the rear door or tailgate of a van or like vehicle.

It is another object of the present invention to provide varying embodiments to enable such a wheel and tire or other object to be vertically located to best fit the space available, providing maximum clearance from windows, bumpers, lights, license plates, etc., depending upon the exct placement of such features on the individual vehicle.

It is a further object of the present invention to provide an apparatus for the carriage of a spare wheel and tire or other object which enables the wheel, tire or object to be quickly and easily moved from its normal position adjacent to the door of the vehicle to a position enabling such door to be opened fully.

An additional object of the present invention is to provide an improved vehicle spare wheel and tire apparatus including a hinged bracket mechanism carried by a vehicle rear door and swingable when the door is opened, to position a wheel thereon adjacent a side of the vehicle, thereby allowing the door to be fully opened.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
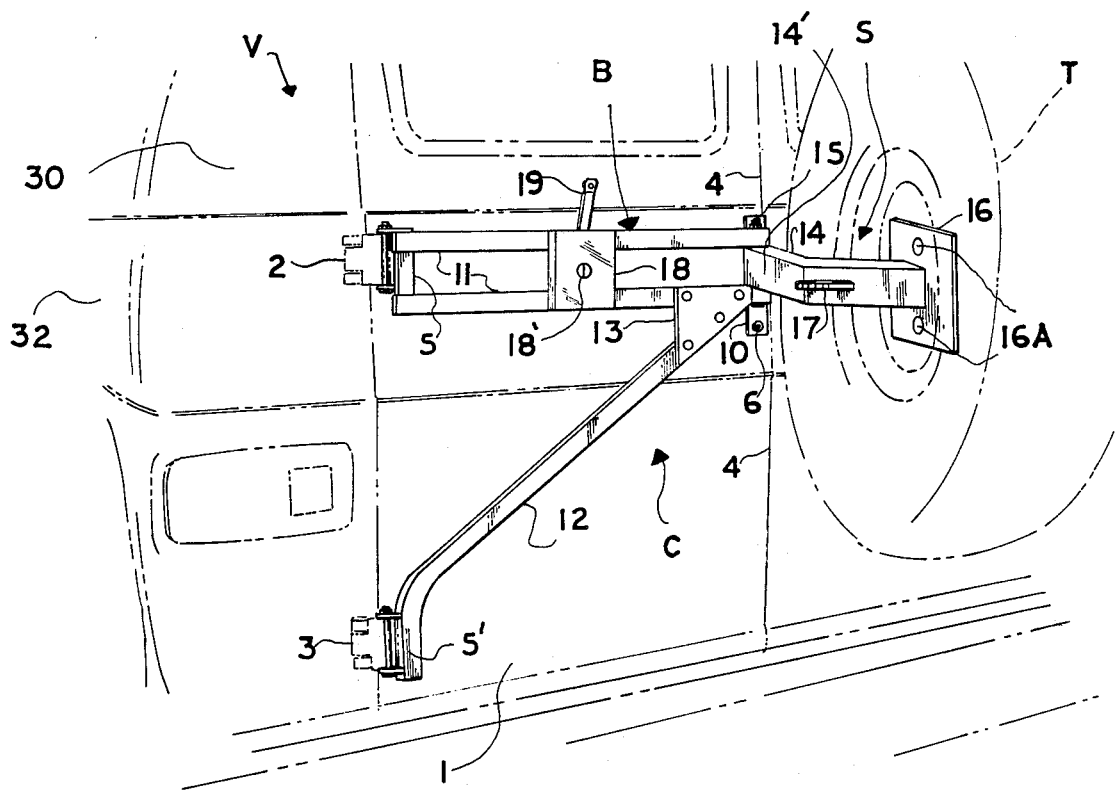
FIG. 1 is a perspective view of one embodiment of the spare wheel and tire carrier.
Figure 2:
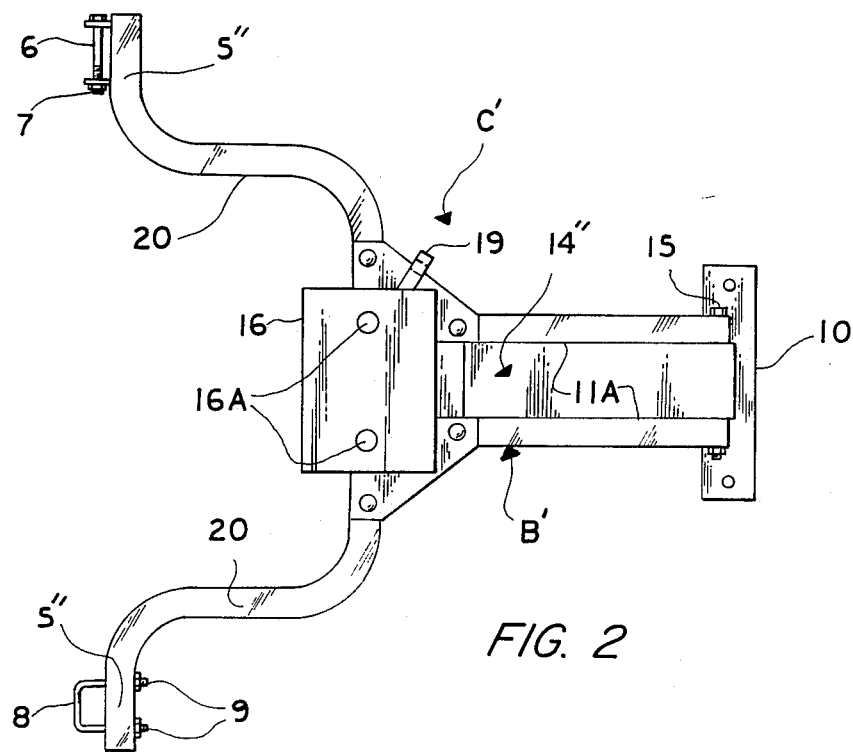
FIG. 2 is a front elevation view of an alternate embodiment of the apparatus, as it would appear when attached to the back of a vehicle door.
Figure 3:
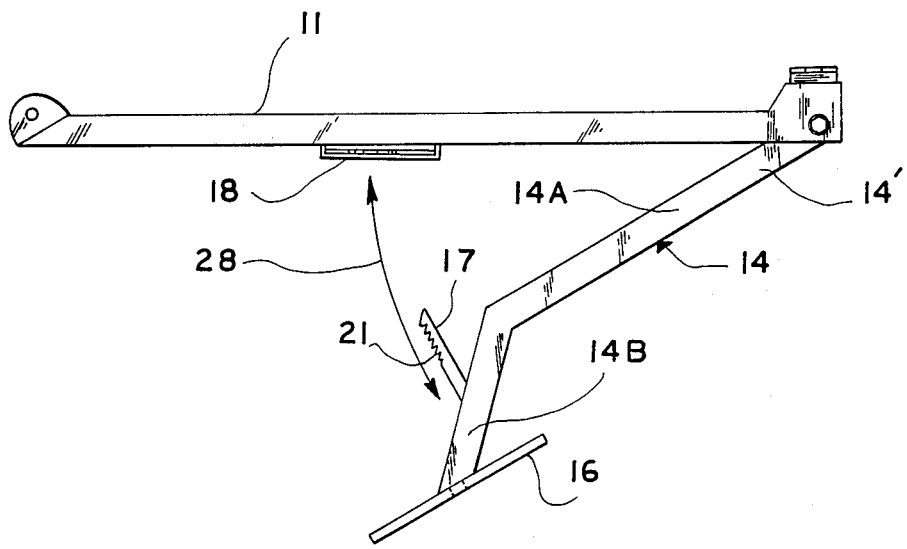
FIG. 3 is a top plan view of the carrier apparatus shown in FIG. 1.

Referring now to the drawings, particularly FIGS. 1 and 2, the present invention will be understood to relate to a carrier apparatus C or C' for the secure stowage of a spare wheel and tire T or other equipment, particularly exteriorly of a door, such as one of the rear doors 1 of a van or similar type of vehicle V. The carrier C of FIGS. 1 and 3 include a base assembly B affixed to the door exterior by means of a first end member 5, 5' at one end of the base assembly, and a second end member 10 at its opposite end. The base assembly B will be seen to substantially span the width of the door 1 with the first end members 5,5' suitably attached to the upper and lower door hinges 2,3 respectively while the second end member 10 is affixed to the door djacent its free edge 4. Any suitable fasteners such as the bolts and nuts 6,7 may be employed for this attachment.

A pair of spaced apart conncting elements 11—11 join the two mounted end members 5, 10 and cooperate with a swing assembly S comprising a swing arm 14 having a pivot end 14' disposed between the two connecting elements 11—11 and pivotally mounted thereupon by means of a vertically disposed pintle 15 or the like. The other end member 5' is part of a diagonal brace 12 with its opposite end rigidly affixed to the lowermost one of the connecting elements 11, such as by a gusset 13. The swing arm 14 will be seen to include a substantially straight first section 14a joined to an outwardly angled second section 14b, the latter of which supports a wheel attachment plate 16 in a plane substantially parallel with the arm first section 14a, for reasons which will become apparent hereinafter.

The above described swing arm wheel plate 16 is adapted to support a mounted tire T with the plate 16 disposed within the normal deep recess existing on the inside face of most vehicle wheels. The wheel is attached to this plate 16 by means of any well known type of removable fasteners insertable within the plate openings 16a. The swing arm 14 will be understood to be pivotally displaceable from an opened position as shown in FIG. 1, to an intermediate position as reflected in FIG. 3, and to a closed position wherein the arm is nested between and flush with, the connecting elements 11—11. In this latter, closed position, the wheel plate 16 and its mounted wheel will be understood to be juxtaposed and parallel to the base assembly B and vehicle door 1.

To securely retain the carrier in the closed position, a latch pin 17 projecting rearwardly from the arm second section 14b is engageable by catch means 18' in a latch plate 18 on the medial portion of the base assembly B.

Figure 4:
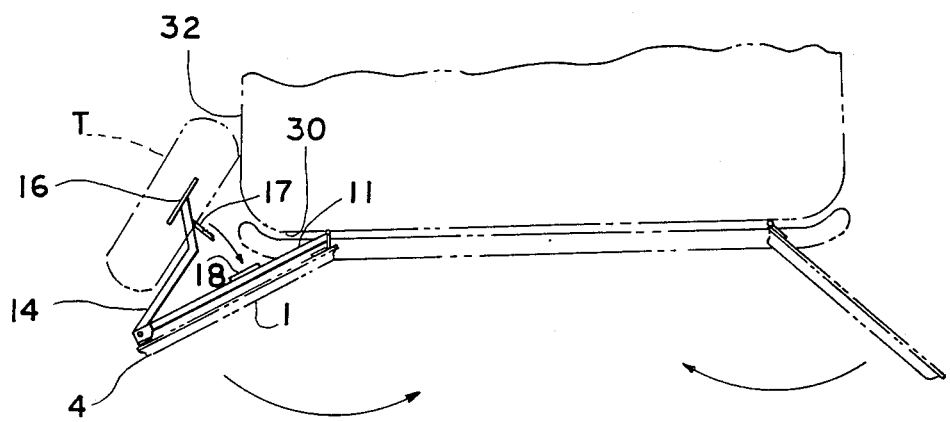
FIG. 4 is a top plan view of the apparatus in its open position, attached to a vehicle door.

The operation of the carrier C may now be described. A release handle 19 permits a user to manipulate the catch means to allow release of the latch pin 17 when it is desired to open the vehicle door 1. Thereafter, the wheel and tire T is swung away from its juxtaposed, parallel stowage position adjacent the door 1, in the direction of the arrow 28 in FIG. 3, after which the door may be opened about its hinges 2, 3 such as depicted in FIG. 4. It will be seen that in this manner, the door 1 may be opened well past a 90 degree displacement so that full access is had to the vehicle interior. When the door is opened, its free edge 4 is well past an extension of the plane of the vehicle side wall 32. In view of the displacement of the swing arm 14, the wheel and tire T is positioned clear of the vehicle rear wall 30 and located laterally of the vehicle side wall 32.

In the embodiment of FIG. 2, an alternative, generally symmetrical carrier C' is shown and which will be understood to operate in the same manner as the above described carrier C. The choice of a carrier embodiment will depend upon the configuration of the associated vehicle and door as well as the location of the door hinges. Should it be desired to mount the wheel and tire at a level intermediate two door hinges, then the carrier C' may be appropriate and wherein the two spaced apart connecting elements 11a—11a of the base assembly B' laterally extend from the door end bracket 10 to a point well short of the opposite, hinge edge of the door. Each connecting element 11a is then, in turn, joined to a curved or angular element 20 terminating in an end member 5". Each end member 5" is suitably joined to one of the hinge leaves by any appropriate device such as the illustrated nut and bolt 7,6 or U-shaped member 8. The swing arm 14" includes offset sections as does the arm 14 in the previously described embodiment, as well as a wheel plate 16, latch pin, catch plate and release member 19.

It is to be understood that the present invention is not limited to the embodiments described above, but encompasses any and all variations within the scope of the appended claims.

What is claimed is:

1. A carrier for a spare wheel and tire or the like adapted to be mounted on a vehicle door having opposite vertical edges with one edge hingedly connected to the vehicle and the opposite edge defining a free edge, comprising;
    a base assembly having opposite portions each provided with an end member,
    means attaching said base assembly end members to a vehicle door respectively adjacent said door opposite edges,
    a swing arm having a first end section provided with means for pivotally mounting said arm to said base assembly adjacent said free edge,
    said swing arm including a second end section joined to said first end section,
    means on said second end section permitting the removable attachment of a wheel thereupon,
    said swing arm being pivotally mounted to swing outwardly of said base assembly when said wheel is mounted thereon,
    releasable catch means on said base assembly, and
    latch means on said swing arm engageable with said catch means when said swing arm is displaced about said pivot means to a position juxtaposed said base assembly, whereby
    operation of said releasable catch means allows displacement of said swing arm and a wheel attached thereto, to a position angularly spaced from the vehicle door to permit opening of the door without interference from the body of the vehicle.

2. A carrier according to claim 1 wherein,
    said swing arm second end section is angularly offset from said first end section, and
    said attachment means on said second end section including a wheel plate.

3. A carrier according to claim 1 wherein,
    said base assembly includes a pair of vertically spaced apart connecting elements, and
    said swing arm is pivotally displaceable between said spaced apart connecting elements.

4. A carrier according to claim 1 including,
    a pair of said end members respectively attached to two hinges on said door.

5. A carrier according to claim 1 wherein,
    said catch means is substantially intermediate said base assembly opposite ends.

6. A carrier according to claim 1 wherein,
    said swing arm pivot means is disposed adjacent the free edge of the vehicle door.

* * * * *